Figure 1:
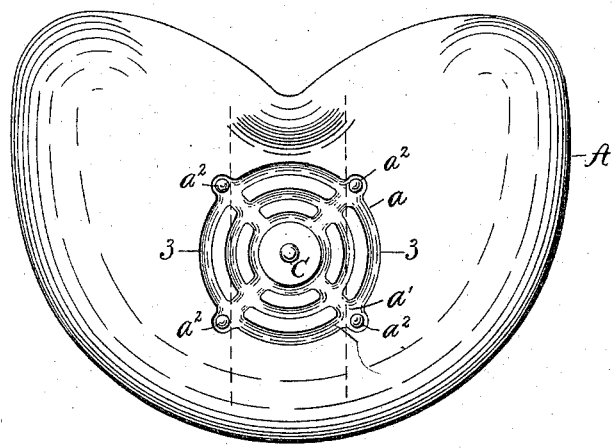

(No Model.)

G. H. WADSWORTH & H. W. AVERY.
PRESSED STEEL SEAT.

No. 526,273. Patented Sept. 18, 1894.

WITNESSES.

INVENTORS:
George H. Wadsworth
Henry W. Avery
By Wing + Thurston
Their attys

United States Patent Office.

GEORGE H. WADSWORTH AND HENRY W. AVERY, OF CLEVELAND, OHIO, ASSIGNORS TO THE AVERY STAMPING COMPANY, OF SAME PLACE.

PRESSED-STEEL SEAT.

SPECIFICATION forming part of Letters Patent No. 526,273, dated September 18, 1894.

Application filed May 28, 1894. Serial No. 512,681. (No model.)

*To all whom it may concern:*

Be it known that we, GEORGE H. WADSWORTH and HENRY W. AVERY, citizens of the United States, residing at Cleveland, in the county of Cuyahoga and State of Ohio, have invented certain new and useful Improvements in Pressed-Steel Seats; and we do hereby declare the following to be a full, clear, and exact description of the invention, such as will enable others skilled in the art to which it appertains to make and use the same.

Our invention relates to pressed steel seats, such as are used on cultivators, hay rakes, mowers and reapers, and other agricultural machines, and it relates particularly to the construction whereby the seats may be readily adapted to be secured and rigidly fastened to a supporting spring or bar of any width.

Heretofore in the manufacture of pressed steel seats several expedients have been employed to co-operate in effecting a permanently rigid connection of the seat on the supporting spring or bar. In one construction, two tongues have been punched downward from the bottom of the seat, and when the seat is secured to the supporting spring or bar by one bolt, these tongues lie on opposite sides of and in contact with said spring or bar, whereby the seat is prevented from turning. This construction is objectionable because it weakens the seat, and also because the edges of the holes from which the tongues are punched are liable to wear and tear the rider's clothes. In another construction, two parallel ribs have been pressed down in the center of the seat, so that when the seat is secured by one bolt to the supporting spring or bar, said ribs lie on opposite sides of and in contact with said spring or bar. The chief objection to this construction, from a manufacturer's standpoint, (and the same objection holds with respect to the construction first named) is this, viz: It is necessary that the distance between the ribs and tongues shall be substantially equal to the width of the spring or bar to which it is attached, consequently this distance must be varied in different seats to make them fit the different supporting bars or springs employed by the different implement makers, wherefore the makers of seats have had to employ different dies to make the different seats, although said seats differ from each other only in the distance between the ribs or tongues. Another objection to both prior constructions mentioned, as well as to all prior constructions we are acquainted with, is that the under part of the seats, between the ribs or tongues, lies flat against the spring or bar, wherefore the nut on the fastening bolt works loose and the seat is permitted to wabble.

The seat hereinafter described, containing our invention, is not open to any of the above mentioned criticisms. They may be made in quantities and subsequently finished to fit any spring or bar; and the center of said seat, through which the fastening bolt passes, does not lie against said bar or spring, but above it, whereby it exerts an action like a spring nut lock which tends to prevent the nut on the bolt from becoming loose.

Figure 2:
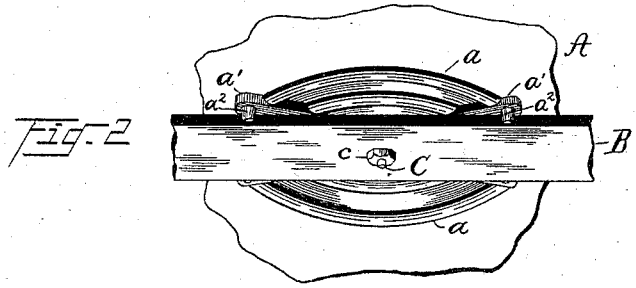
Figure 3:
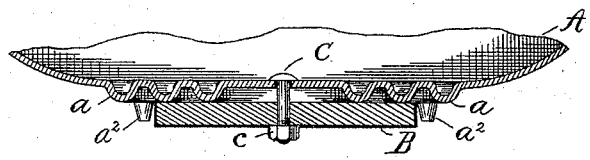

In the drawings, Figure 1 is a plan view of the seat. Fig. 2 is a perspective view of a portion of the under side thereof; and Fig. 3 is a sectional view on line 3—3 of Fig. 1.

Referring to the parts by letter, A represents the seat which is swaged out of sheet steel.

B represents the supporting spring or bar to which the seat is secured. The center of the seat, through which passes the bolt C, by which the seat is secured to the spring, is raised above the part of the seat which rests upon said spring. This effect is produced by pressing down from the seat one or more annular ribs $a$, the lower sides of which ribs rest upon the spring B. Intersecting the annular ribs $a$ are the cross ribs $a'$, which are likewise pressed down from the seat to the same depth as the ribs $a$. These cross ribs are preferably, but not necessarily, at right angles to each other. At suitable points on the under side of the cross ribs $a'$ are the downward projections $a^2$ which are designed to lie on opposite sides of and close to the supporting bar or spring. Preferably these projections are the rather large heads of rivets which pass through and are fastened in holes formed at the proper points in the ribs $a'$.

It is clear that the seats without the rivet holes may be made and kept in stock and that the rivet holes may be subsequently made in whatever parts of the cross ribs $a'$ it may be necessary to make them to cause the rivets to lie close to the sides of the spring B.

The raised center of the seat does not touch the spring B. The bolt C passes through this center and through the supporting bar or spring B. When the nut $c$ is screwed up tightly, the ribs $a$ and $a'$ are drawn tightly against the said spring or bar, and the raised center acts after the fashion of a spring nut lock to prevent the nut from working loose.

It has been found with this improvement, seats may be made from steel two to four gage lighter than the older form of seats, and withstand the strain and remain rigid on their support.

Having described our invention, we claim—

1. A pressed steel seat having a raised center through which is formed the hole for the connecting bolt, combined with rivets fastened in said seat and having their heads depending therefrom, substantially as and for the purpose specified.

2. A pressed steel seat having a raised center through which is formed a hole for the connecting bolt, one or more down-pressed annular ribs surrounding said raised center, and down-pressed ribs intersecting said annular ribs and lying in the same plane with them, substantially as and for the purpose specified.

3. A pressed steel seat having one or more down pressed annular ribs $a$, and diverging ribs $a'$ intersecting said annular ribs and lying in the same plane, combined with rivets secured to the seat in said diverging ribs and having their heads extending down below the plane in which said ribs lie, substantially as and for the purpose specified.

4. A pressed steel seat having a raised center through which is formed a hole for the connecting bolt, down-pressed ribs which are adapted to rest upon the supporting bar or spring, and projections which extend downward from said ribs and are adapted to lie close to and on opposite sides of the said supporting bar or spring, substantially as and for the purpose specified.

In testimony whereof we affix our signatures in presence of two witnesses.

GEO. H. WADSWORTH.
HENRY W. AVERY.

Witnesses:
E. L. THURSTON,
L. F. GRISWOLD.